United States Patent
Hertzman et al.

(10) Patent No.: US 7,908,752 B2
(45) Date of Patent: Mar. 22, 2011

(54) GEODETIC INSTRUMENT AND RELATED METHOD

(75) Inventors: Mikael Hertzman, Sollentuna (SE); Magnus Westermark, Ekerö (SE); Set Svanholm, Sollentuna (SE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 12/448,604

(22) PCT Filed: Dec. 27, 2006

(86) PCT No.: PCT/EP2006/012535
§ 371 (c)(1),
(2), (4) Date: Sep. 15, 2009

(87) PCT Pub. No.: WO2008/077432
PCT Pub. Date: Jul. 3, 2008

(65) Prior Publication Data
US 2010/0037474 A1    Feb. 18, 2010

(51) Int. Cl.
*G01C 5/00* (2006.01)
(52) U.S. Cl. .......................................... 33/290
(58) Field of Classification Search .................. 33/290, 33/291, 292
See application file for complete search history.

(56) References Cited

U.S. PATENT DOCUMENTS

| | | | |
|---|---|---|---|
| 6,044,567 A * | 4/2000 | Feist | 33/292 |
| 6,411,372 B1 | 6/2002 | Donath et al. | |
| 2006/0021236 A1 | 2/2006 | Endo | |
| 2009/0260240 A1* | 10/2009 | Bernhard et al. | 33/295 |
| 2010/0119161 A1* | 5/2010 | Moeller | 33/228 |
| 2010/0186243 A1* | 7/2010 | Schumacher | 33/228 |
| 2010/0232714 A2* | 9/2010 | Moeller | 33/228 |

FOREIGN PATENT DOCUMENTS
EP       0 971 207       1/2000

* cited by examiner

*Primary Examiner* — G. Bradley Bennett
(74) *Attorney, Agent, or Firm* — Harness, Dickey & Pierce, P.L.C.

(57) ABSTRACT

A geodetic instrument is disclosed, wherein an image sensor is used for locating the instrument above a desired point on the ground. The positioning of the image sensor with respect to the instrument vertical rotation axis is determined, or calibrated, using a method where two images are captured at different horizontal rotational positions for the instrument, and where the center pixel of the image sensor is related to the vertical rotation axis by means of image processing. It is also disclosed how reflecting elements, such as prisms, may be used for providing stereoscopic vision that can be used for determining the instrument height above the ground.

17 Claims, 7 Drawing Sheets

GEODETIC INSTRUMENT AND RELATED METHOD

TECHNICAL FIELD

The inventive concept disclosed herein relates generally to the positioning of geodetic instruments. More particularly, the inventive concept relates to the determination of position and height over the ground for an instrument by means of an image capturing device.

BACKGROUND

Traditionally, optical surveying instruments or geodetic instruments, such as tachymeters or total stations, include sighting means or optical plummets centered on the instrument vertical axis for positioning the instrument over a geodetically fixed reference point. For assisting the centering of the instrument, an optical mark is sometimes used, which is co-aligned with the optical plummet and used for aligning the instrument and the reference point.

In order for the positioning of the instrument to be accurate, the sighting axis of the optical plummet must be accurately aligned with the instrument vertical rotation axis. Consequently, the assembly of the instrument during manufacture requires a time consuming step of mounting the elements for the optical plummet, and calibration for each individual instrument is typically required in order to ensure that the sighting axis of the optical plummet is properly co-aligned with the instrument vertical rotational axis.

Once the instrument has been carefully assembled and calibrated, it is the task of the operator to position the instrument over the geodetically fixed point during use. Such careful positioning of the instrument is also time consuming, and relies entirely upon the operator to make the positioning accurate.

U.S. Pat. No. 6,044,567 discloses a geodetic device in which a position-sensitive photoreceiver or a CCD matrix comprising CCD elements is used for providing control signals to motor-operated drives for positioning a vertical axis of the device over a ground point.

Published US patent application US 2006/0021236 discloses a surveying instrument including, inter alia, an image pickup means for picking up an area located under a vertical shaft of an instrument body; and a decentering-amount calculation means for calculating an amount of decentering of a survey point with respect to an instrument center.

SUMMARY

It is an object to provide a geodetic instrument for which both assembly during manufacture and positioning during use are simplified.

More particularly, it is proposed to include in the geodetic instrument a camera or similar device, capable of capturing an image of the ground below the instrument. The image capturing device may be a CCD, a CMOS sensor or the like. The image captured by the camera may be displayed on a screen for indicating to the operator which portion of the ground is seen by the camera, together with a cross hair, a dot or similar for indicating the instrument nadir.

By relating a desired origin of coordinates to the captured image(s), and by relating the instrument nadir or center point to the captured image(s), any displacement between the desired origin of coordinates and the instrument nadir may be accounted for without physically moving the instrument. It suffices that the desired origin of coordinates is within the field of view of the image capturing device and that the instrument height above the ground is known.

As used herein, "instrument nadir" is the downwards direction of the instrument's vertical rotational axis.

The desired origin of coordinates may be indicated, for example, by means of a recognized pattern on the ground under the instrument, or by an operator manually indicating the desired origin on a screen or the like showing the captured image.

In the prior art, it has been a time consuming procedure during manufacture of geodetic instruments to accurately position plummet means in alignment with the vertical rotational axis of the instrument. According to the inventive concept disclosed herein, the plummet means comprises an image capturing device or image sensor, such as a camera of suitable type. As will be described in more detail below, it is sufficient if the image capturing device is positioned such that the downwards view along the vertical rotational axis of the instrument falls within the field of view of the image capturing device, thus alleviating the need for extremely accurate mounting.

Typically, when the instrument is assembled, the center point of the image capturing device (center pixel of the image sensor) will generally not coincide with the vertical rotational axis of the instrument. Advantageously, however, a procedure disclosed herein may be followed for relating the image captured by the camera to the vertical rotational axis of the instrument. This procedure may be seen as one example of a method for calibrating the image capturing device with respect to the instrument vertical rotational axis.

To this end, there is provided a method in a geodetic instrument having an image sensor for capturing an image of the ground below the instrument, comprising the steps of:

capturing a first image using said image sensor;

rotating the instrument around its vertical axis to a new rotational position;

capturing a second image using said image sensor; and processing the captured images to correlate a nadir point for the instrument vertical rotation axis in relation to the image capturing device.

In order to determine any displacement between the center point of the image capturing device and the instrument vertical rotational axis (or the instrument nadir), the following procedure may be employed. A first image is captured by the camera. The instrument is then rotated, e.g. 180 degrees (200 gon), about its vertical axis to a new rotational position. Then, a second image is captured by the camera. By means of image processing capabilities within the instrument (or possibly remote from the instrument), the first and second images are then processed in order to find the instrument nadir (the vertical rotational axis) with respect to the captured images. As will be understood and as will be explained in more detail below, any displacement of the center point for the image capturing device with respect to the instrument nadir or vertical rotational axis can be found by calculating the merging distance required in order to make the two captured images overlap, wherein the instrument nadir will correspond to half the merging distance in the captured images. In this manner, it is possible to identify which point (e.g. pixel) on the image sensor that corresponds to the instrument nadir. On the instrument screen, a cross hair, a dot or similar may then be displayed at the calculated instrument nadir if desired.

Once the instrument nadir has been correctly related to the images captured by the camera, the nadir point over which the instrument rotates during use may be indicated on a screen, to aid an operator during placement of the instrument.

For example, the operator may in the image shown on the instrument screen indicate a desired origin of coordinates for measurement to be made using the instrument. Any difference between the desired origin of coordinates and the determined instrument center point or nadir may then be accounted for by a mathematical displacement of the instrument coordinate system, without any need for further physical repositioning of the instrument. This may prove to be an important advantage for the operator, minimizing the time required for accurately positioning the instrument over a predetermined ground mark. As long as the desired origin of coordinates is within the field of view of the image capturing device (the camera), a mathematical displacement may provide for the offset.

Hence, in an instrument according to the principles described herein, there is provided an image capturing device, such as a CCD or a CMOS sensor, for capturing an image along the downwards vertical rotational axis of the instrument. A lens is typically provided in front of the image capturing device, as will be understood. The image capturing device is suitably arranged in fixed relation to the instrument alidade, such that the captured image will be rotated together with the instrument alidade.

The instrument further typically comprises means for storing image processing software and processing means, effective to perform image processing of the captured images. Generally, the image processing may be performed by software, hardware, firmware or any other suitable means for analyzing and processing digital images.

Preferably, the instrument is further provided with a screen, upon which the captured images may be shown. The screen may also be used for displaying a cross hair or a dot, representing the instrument center line (instrument nadir) with respect to the captured image.

In addition, an operator may be provided means for indicating a point, such as a desired origin of coordinates in the displayed image. To this end, the screen may be a touch screen, or means may be provided for moving a cursor over the displayed image.

The general inventive concepts disclosed herein may also be utilized for determining the instrument height over the ground.

More particularly, there is provided a method for determining a height above ground for a geodetic instrument comprising an image sensor, lens means for forming an image on said image sensor, and means for effecting a parallel displacement of a ray impinging upon said image sensor, comprising the steps of:

capturing a first image of the ground using a parallel displacement of the ray;

capturing a second image of the ground;

determining a separation between the first and the second image on the image sensor; and calculating the height based on the amount of parallel displacement, said separation, and the focal length of said lens means.

To this end, embodiments of the present invention may comprise reflecting elements, such as prisms or the like, which are displaced from the instrument vertical axis and which have the purpose of directing images of the ground under the instrument towards the image capturing device. By having the reflecting elements providing an image of the ground under the instrument at a non-normal angle of incidence, by effecting parallel displacement of image rays, the corresponding reading on the image sensor will be displaced from the center. Using, for example, two such reflecting elements will provide two readings on the image capturing device. By analyzing the displacement between two such readings, and provided that the displacement of the reflecting elements from the instrument vertical axis is known, it becomes possible to calculate the height of the instrument above the ground below. Preferably, the reflecting elements are designed such that they provide a parallel displacement of the field of view into the image capturing device. The larger such parallel displacement is, the larger will the separation be between the readings on the image capturing device. Hence, by determining the separation between the two readings on the image capturing device and knowing the displacement of the reflecting elements, the instrument height can be calculated. This will be described in more detail in the description below.

As will be understood, the methods disclosed herein are preferably performed by using computer software incorporated into the geodetic instrument. Thus, the present invention also relates to computer software for performing the methods.

BRIEF DESCRIPTION OF THE DRAWINGS

In the detailed description that follows, reference is made to the accompanying drawings, on which.

Although the figures may illustrate currently preferred embodiments, it is to be understood that they represent illustrative examples without any intention to limit the claimed scope.

DETAILED DESCRIPTION

Figure 1:
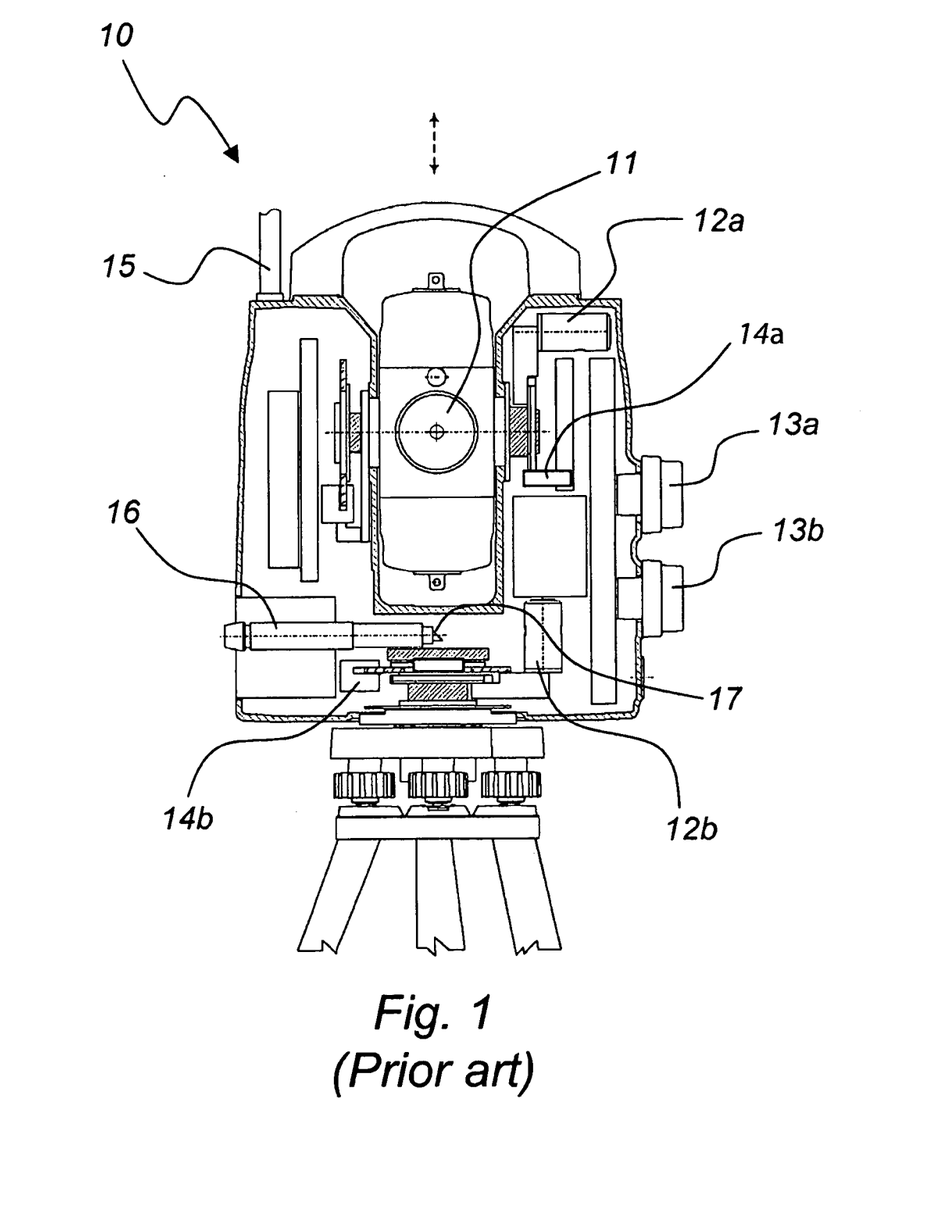
FIG. 1 illustrates a prior art total station which is provided with a conventional optical plummet.

FIG. 1 shows a partially cut-out picture of a prior art total station 10. The total station is provided with usual devices and sub-components, such as a center unit 11 for performing distance measurements, servo motors 12a, 12b for aiming the instrument, manual knobs 13a, 13b for manual aiming of the instrument, means 14a, 14b for determining vertical and horizontal rotation angles of the instrument, an antenna 15 for radio communication, etc. Particularly, the total station has an optical plummet 16, comprising an eyepiece extending from the housing and into a position at the center axis of the total station. At the point where the sight line of the eyepiece coincides with the vertical rotational axis of the total station, there is provided deflecting means, such as a mirror or a prism 17, which provides for a view downwards along the vertical rotational axis of the instrument. This optical plummet is during use of the instrument used for assisting positioning of the instrument's vertical rotational axis over a desired ground point. The operator typically looks into the eyepiece and physically positions the total station at the desired location guided by the view provided by the optical plummet.

In order for this procedure to be effective, at least two tasks must be performed very accurately. Firstly, the eyepiece must be mounted, during assembly of the total station, such that the view provided coincides with the vertical rotational axis of the total station. In particular, the mirror or prism 17 that provides the downwards view must be positioned very accurately at the vertical axis of the instrument. Secondly, the operator must carefully position the total station 10 at the desired location. While manufacturing technology may allow for the eyepiece to be correctly positioned during the assembly of the instrument, it is still a time consuming and costly manufacturing step typically requiring manual fine tuning of the eyepiece position. Further, even when the eyepiece is correctly mounted in the total station, correct positioning of the instrument during use is entirely at the responsibility of the operator, and relies upon his or her skill to be accurate in handling the total station in the field.

Figure 2:
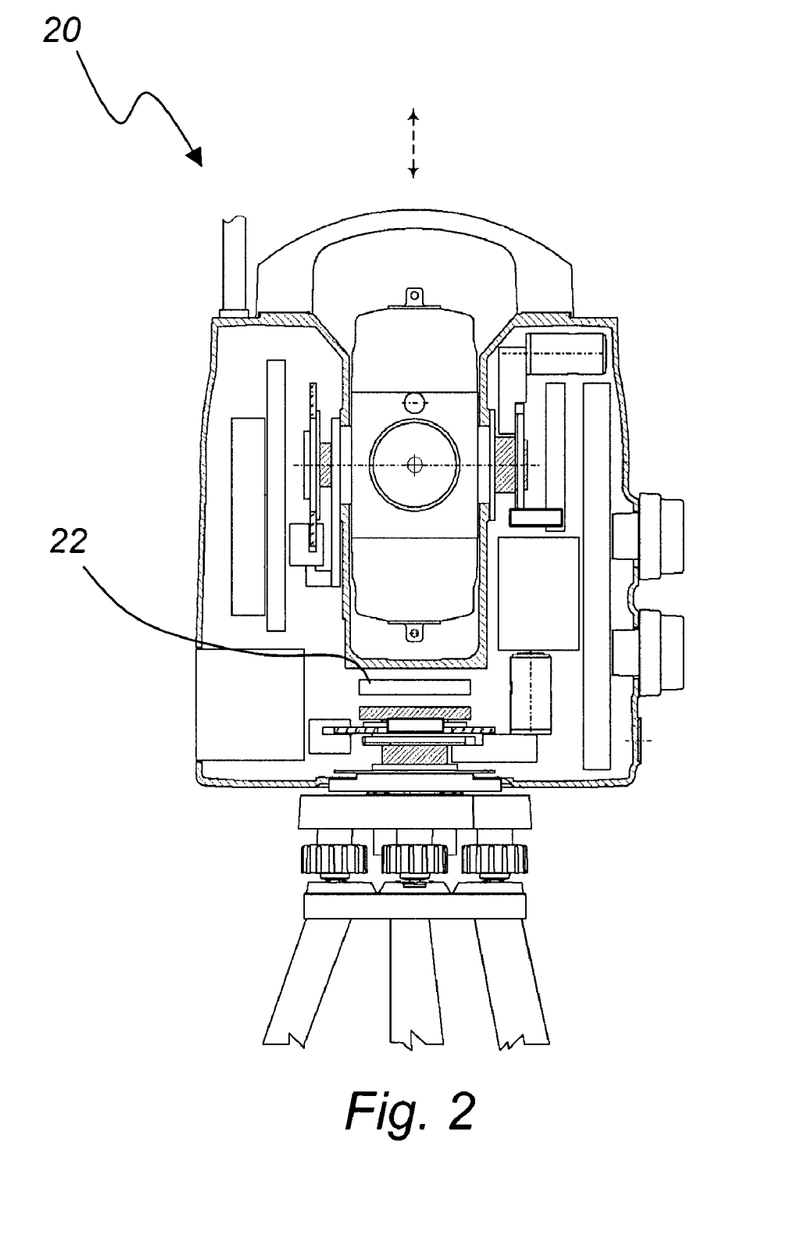
FIG. 2 illustrates a total station according to the present invention, wherein an image sensor is employed instead of the conventional optical plummet.

According to the inventive concept described and claimed herein, it is proposed to replace the prior art optical plummet 16 and eyepiece with an image capturing device/sensor 22, such as a CCD, a CMOS sensor or the like. Such total station 20 is shown in FIG. 2. The image capturing device need not be centered exactly at the instrument vertical axis. Rather, it suffices that the instrument vertical axis coincides with some portion of the image capturing device, such that the instrument nadir can be captured. As will be described in more detail below, image processing and a method according to the present invention may then be used for determining the instrument nadir.

To illustrate how the image capturing device may be used for determining instrument nadir and for relating measurements made by the instrument to a desired coordinate system (origin of coordinates), reference is made to FIG. 3*a-d* and FIG. 4 of the drawings.

For the procedure described below, it will be assumed that the instrument 20 is already appropriately level, and that the desired origin of coordinates is located within the field of view of the image sensor 22.

The following procedure may advantageously be followed during manufacture for calibrating the position of the image sensor 22 with respect to the instrument vertical rotational axis. Within reasonable environmental conditions, the positional relationship between the sensor 22 and the moving parts of the instrument 20 will remain substantially constant, and a second calibration is normally not required. It is, however, also conceivable that the instrument is delivered to the end user without being calibrated, and the end user may then follow this procedure at least once for making the calibration. The end user may also wish to recalibrate the instrument if, for example, the environmental conditions have changed considerably, or following a system reset or for any other reason.

Figure 3A:
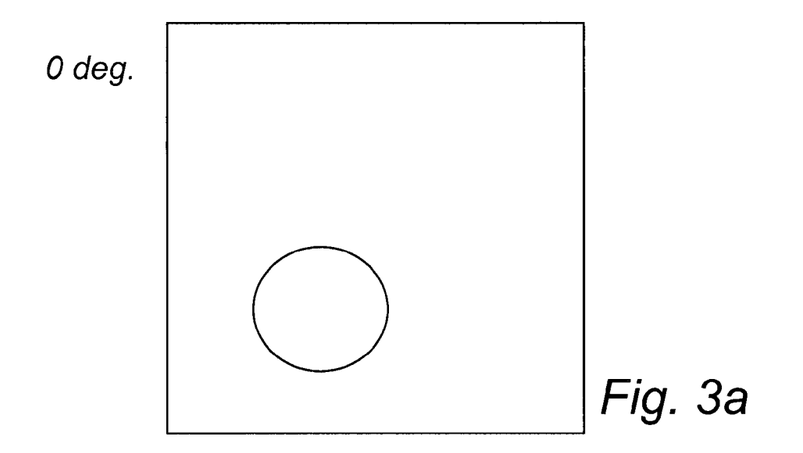
FIG. 3a-d are schematic pictures illustrating how images are captured and processed according to the present invention.
Figure 3B:
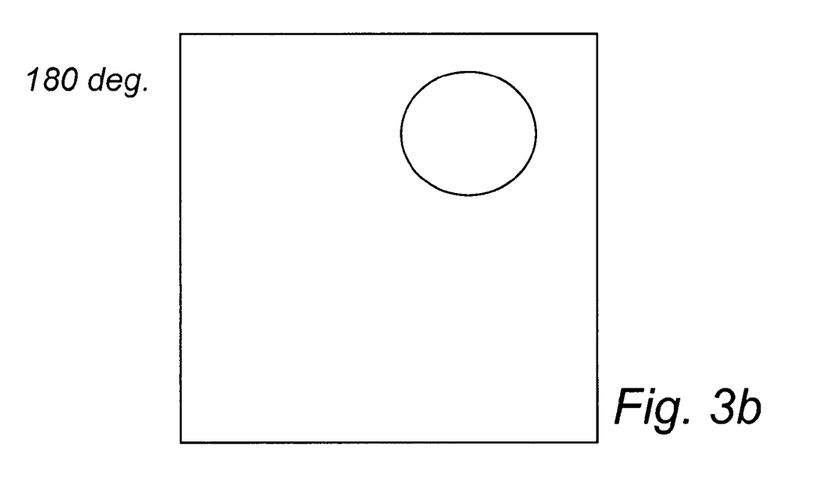

A first image of the ground below the instrument is captured (FIG. 4, step 401) by the image capturing device 22. As illustrated in FIG. 3*a*, this first image is captured at a relative rotational position for the instrument of 0 degrees. As will be understood, this may be any rotational position which has been selected for the first image. Then, the instrument is rotated (step 402) to a new rotational position, in this example 180 degrees relative to the first rotational position, and a second image of the ground below the instrument is captured (step 403) as shown in FIG. 3*b*. It should be noted that the instrument has then been rotated about the vertical rotational axis thereof, and the task of determining instrument nadir relative to the captured images will be equivalent to determining the rotational center of the images captured.

For clarity, the image captured by the camera is represented by a simple circle in FIGS. 3*a* and 3*b*. It will be appreciated, however, that an actual image captured during calibration of the inventive instrument will have more complex features. The basic principle of relating instrument nadir to the image capturing device, however, remains the same.

Figure 3C:
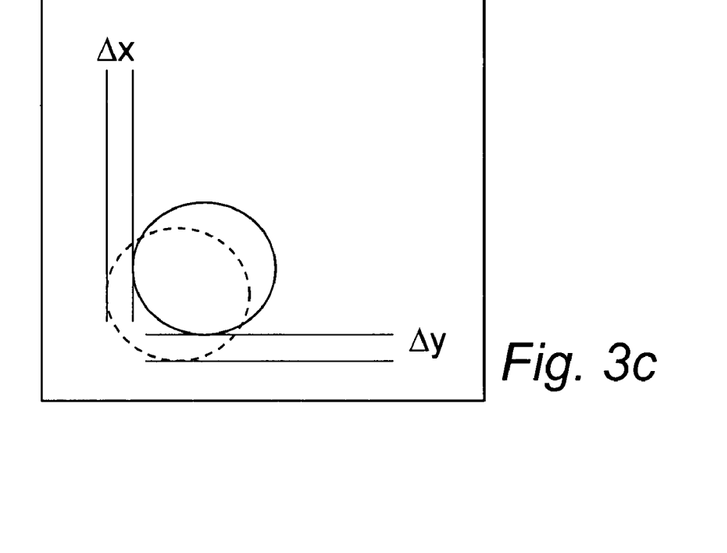

To find the instrument nadir relative to the captured images (i.e. to determine the eccentricity of the image capturing device 22 relative to the instrument vertical rotational axis), image processing within the instrument (or possibly remote from the instrument) is used for calculating the merging distance required in order to make the captured images overlap. To find the merging distance, one of the two captured images in this example is mathematically rotated to correspond to the rotational position of the other image. In other words, the second image may be mathematically rotated from 180 degrees to 0 degrees, or the first image may be rotated from 0 degrees to 180 degrees. This mathematical rotation of the image is made relative to the image center (or reference) point $(x_0, y_0)$. After such mathematical rotation, the images will typically be displaced relative to each other, as illustrated in FIG. 3*c*, wherein the broken circle represents the mathematically rotated image. Image processing in the instrument then determines the merging distance, illustrated in FIG. 3*c* as $\Delta x$ and $\Delta y$. Now, the eccentricity of the image capturing device, i.e. the displacement of the image sensor center $(x_0, y_0)$ relative to the true instrument center (the vertical rotational axis), is given by half the merging distance. Thus, if the image center (center pixel of the image sensor 22) is located at coordinates $(x_0, y_0)$, then the vertical rotational axis (instrument nadir) is located at $(x_0 + \Delta x/2, y_0 + \Delta y/2)$. It will be appreciated that either or both of these coordinates may be negative or positive, depending on the eccentricity of the image capturing device.

In the example above, two images are captured at mutual rotational positions of 180 degrees. It will be understood, however, that other rotations are possible and that more than two images may be captured. The image processing capabilities of the instrument may be designed to handle suitable selections in this regard.

Once the instrument has been thus calibrated, there should normally not be any need for recalibration. However, the procedure for calibrating the instrument in this respect is comparatively simple, and the end user may decide to perform recalibration at any time.

Advantageously, the thus calculated instrument nadir may during use be displayed on a screen of the instrument to provide information to the operator.

Figure 3D:
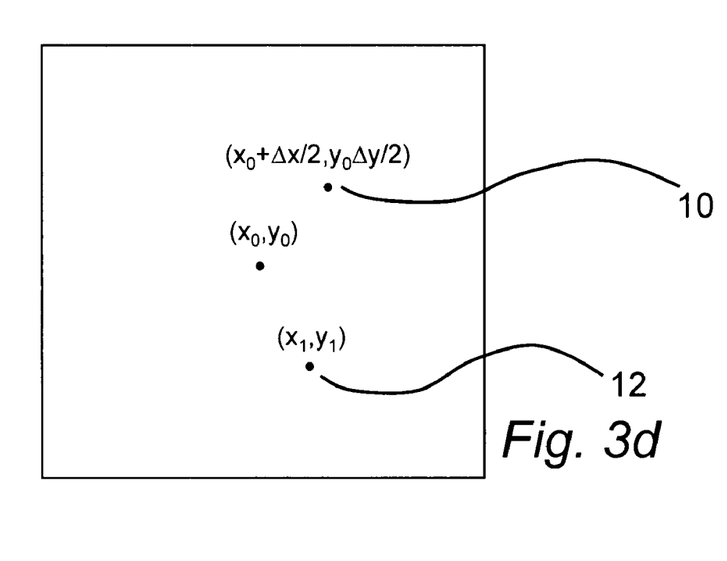
Figure 4:
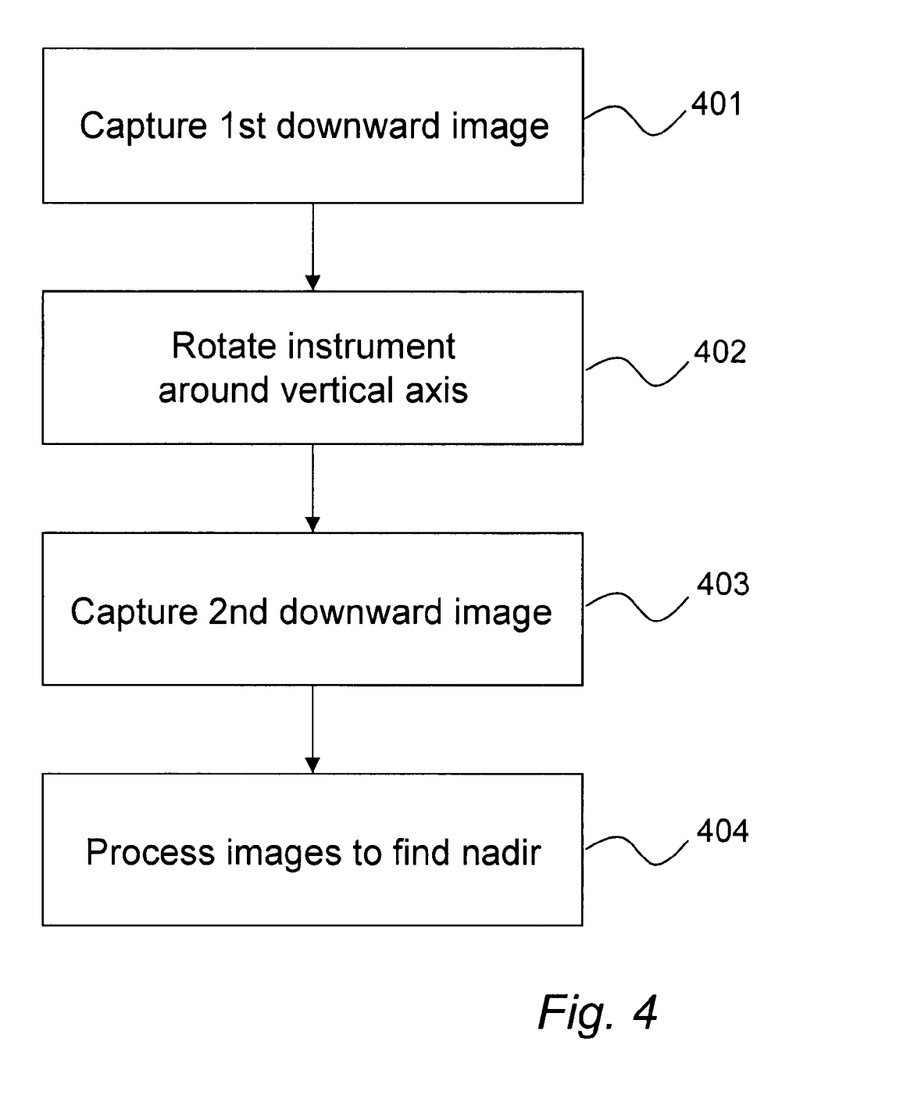
FIG. 4 is a flow chart illustrating the main steps of a method according to this invention.

During use, the operator has the option to physically position and reposition the instrument until a desired origin of coordinates for a subsequent measurement coincides with the calculated instrument nadir. More preferably, however, the operator is given the option to indicate the desired origin of coordinates on the screen of the instrument (or the origin may be identified automatically by image processing and subsequently verified by the operator). This may be accomplished, for example, by the use of a touch screen or by allowing an indicator or cursor to be moved across the screen. The operator may then indicate the desired origin of coordinates to be $(x_1, y_1)$, as illustrated in FIG. 3*d*. Software in the instrument may then provide for the mathematical displacement from the instrument nadir at $(x_0 + \Delta x/2, y_0 + \Delta y/2)$ to the desired origin of coordinates at $(x_1, y_1)$, such that the subsequent measurements performed with the instrument are related to the desired origin at $(x_1, y_1)$. In cases where the resolution of the screen is limited, the origin may be indicated by a larger marker, such as a circle, where the "true" origin is located at the center of mass of the marker.

Embodiments of the present invention may also be designed and structured such that the instrument height above the ground can be determined using the image capturing device, as will now be described with reference to FIGS. 5 and 6.

Figure 5:
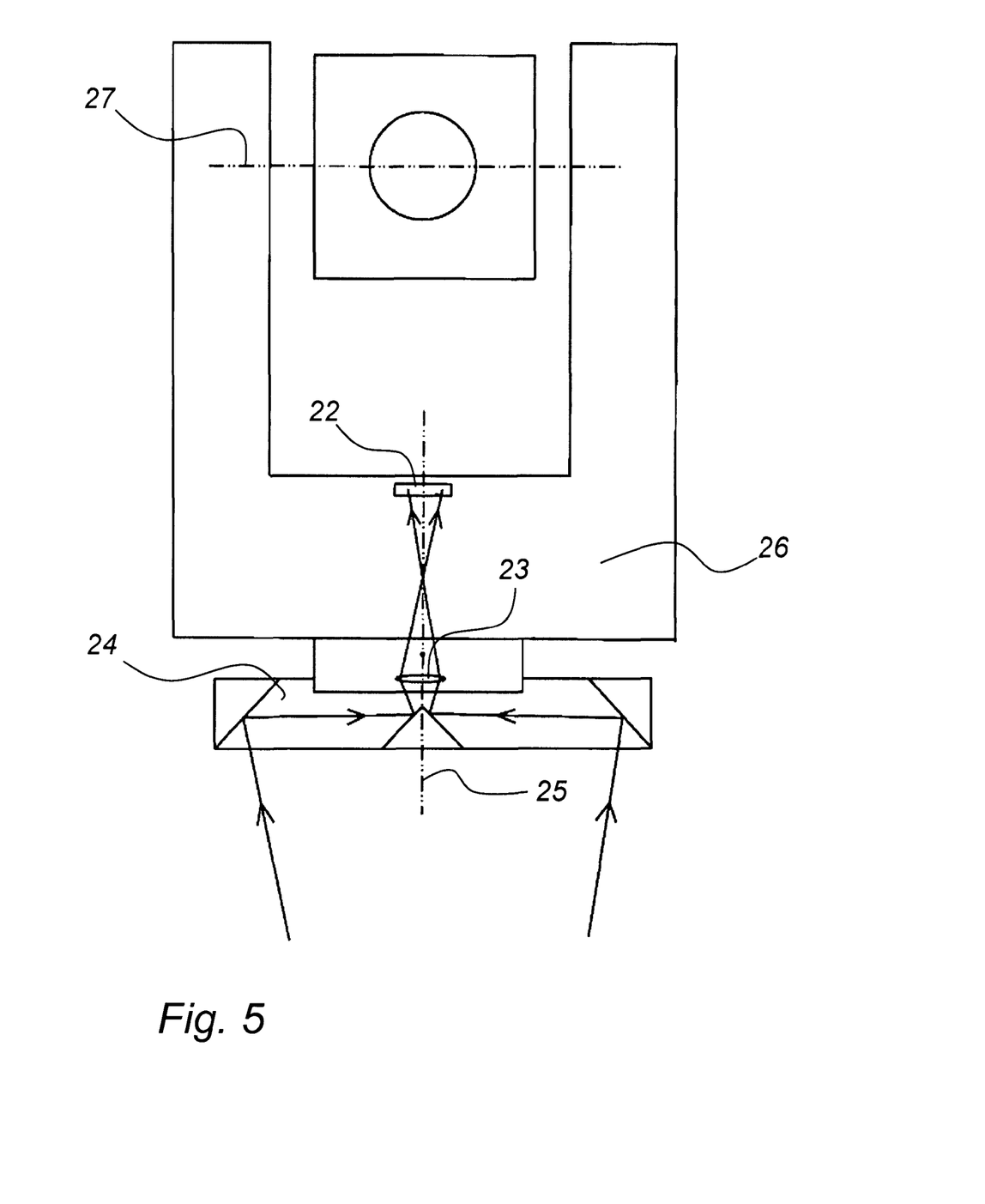
FIG. 5 shows schematically some parts of an instrument according to the present invention, having height measuring capabilities.

FIG. 5 shows schematically a surveying instrument 20 according to the present invention, having the capability of determining the instrument height above the ground below the instrument. To this end, there is provided means, such as reflecting prisms 24 (as will be described below) for providing a stereoscopic view of the ground below the instrument. Such prisms (or similar means) are preferably removably attached to the instrument 20 when a height measurement is to be made. The instrument comprises an image capturing device 22 (such as a CCD or a CMOS sensor, as described above), which may be used for capturing an image or a video feed of the ground below the instrument. A lens 23 is provided for forming an image of the ground onto the image sensor 22. The distance between the lens 23 and the image sensor 22 is preferably substantially equal to the focal length f of the lens 23. The image capturing device and the lens are generally positioned on the vertical rotational axis 25 of the instrument; however, accurate positioning of these elements on the vertical rotational axis is not required, since calibration as described above is preferably performed in order to determine image center with respect to instrument center, i.e. center pixel of sensor 22 with respect to the vertical rotation axis 25. Reflecting elements in the form of a pair of rhomboid prisms 24 are mounted adjacent the lens, in order to provide a displacement of the image rays from the ground below the instrument. Preferably, the displacement is a parallel displacement (thus not affecting the angle of incidence towards the lens). Due to the rhomboid prisms, and the ensuing displacement of the field of view, a single physical feature on the ground below the instrument will cause two displaced images on the image sensor 22. Since the displacement of the image caused by the prisms is known, the instrument height above the ground may be determined from the displacement obtained on the image sensor.

As indicated in FIG. 5, the alidade 26 of the instrument is controlled to rotate about the vertical rotation axis 25 in order to point the instrument in a desired horizontal direction. As for most total stations, the center unit may also be controlled to rotate about a horizontal rotation axis 27 in order to point the instrument in a desired vertical direction. For the height measurement, the prisms 24 effecting the parallel displacement of the rays towards the sensor 22 need not rotate with the alidade 26, but may be fixed under the instrument.

Figure 6:
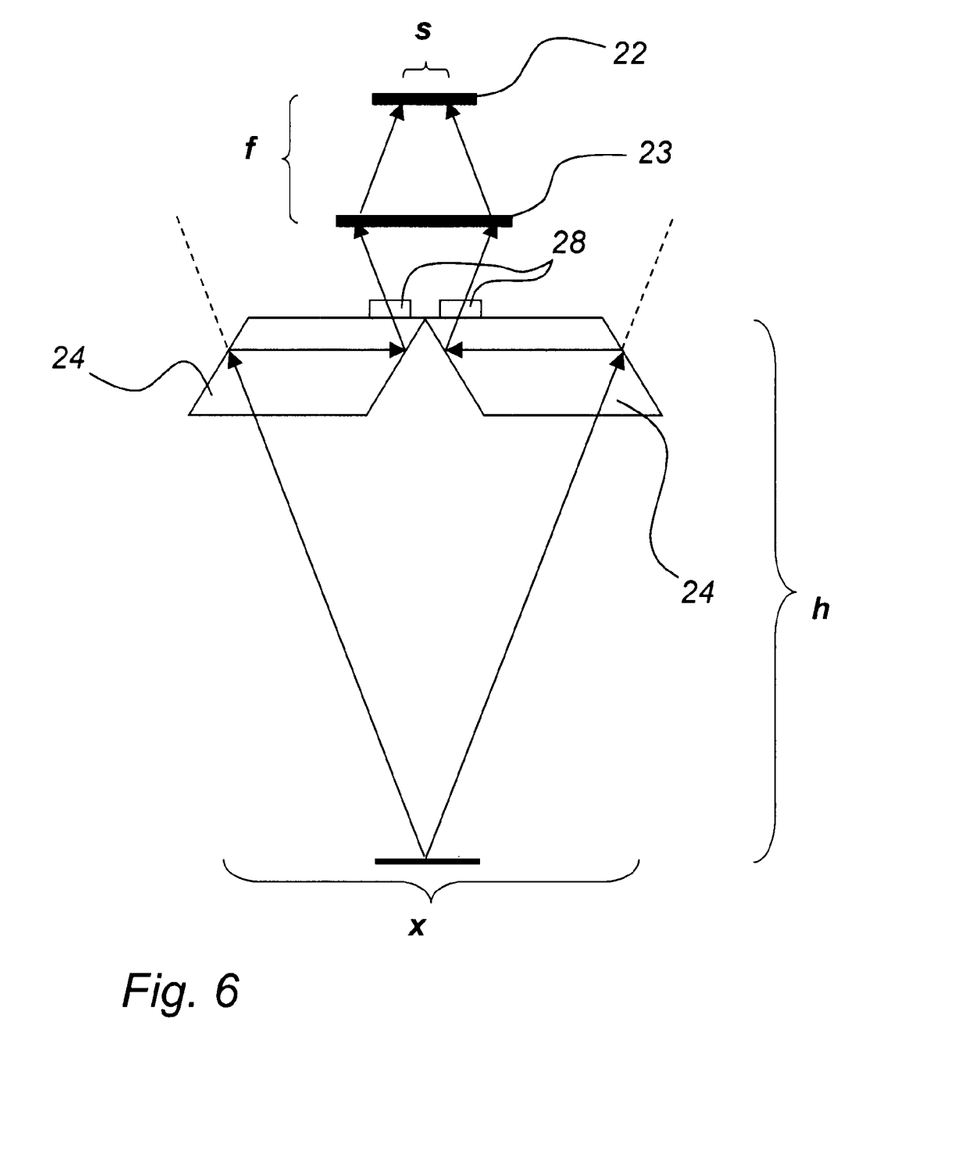
FIG. 6 illustrates schematically how the instrument height can be determined in the instrument schematically illustrated in FIG. 5.

FIG. 6 may be useful for understanding how the instrument height may be determined. It should be noted that FIG. 6 is not drawn to scale, but angles and dimensions are exaggerated for illustrative purposes. As mentioned above, the image capturing device 22 has a certain field of view on the ground below the instrument (the size of which depends on the optical system). The two rhomboid prisms 24 effect a parallel displacement of a respective image within the field of view towards the instrument vertical axis 25 by total internal reflection at the outer edges thereof. After passage through the prisms, the respective image is again reflected by total internal reflection towards the lens 23. In effect, the rhomboid prisms 24 cause a parallel displacement of the respective images, such that they both enter the lens and are focused towards the image sensor. As illustrated, a single feature within the field of view will cause two separate indications on the image sensor, separated by a distance s.

In order to separate the two images caused by the prisms on the image sensor, there are provided means 28 for capturing one of the images at the time. For example, there may be provided color filters, which allow the sensor to read out one image separate from the other, where one image may be captured in the green and the other image in the red. Alternatively, mechanical, electro-mechanical or electronic shutters or the like may be provided, such that only one of the two displaced images at the time reaches the image sensor.

In FIG. 6, the height of the prisms above the ground is designated by h. This is the height that is to be determined. Once the height h has been determined, it is a straightforward task to find the height of any other portion of the instrument by adding or subtracting appropriate structural dimensions of the instrument, as will be understood. Under the assumption that the prisms, the lens and the image capturing device are all firmly mounted in the instrument, the height h can be related to the displacement s between the images formed on the image sensor. Consider now a feature appearing at the instrument nadir point, i.e. at a point where the extension of the vertical axis 25 of the instrument intersects the ground. Under the assumption that the image sensor 22 is located at a distance from the lens 23 equal to the focal length f of the lens, geometrical and/or optical considerations now give that the instrument height h is given by h=(xf)/s, where x is the parallel displacement introduced by the reflecting prisms at height h, f is the focal length of the lens, and s is the image separation on the image sensor caused by the parallel displacement.

For typical instrument heights of 1-2 m, it can be shown that the accuracy in the height determination is a few millimeters or better, depending on the resolution of the image capturing device. In order to estimate the accuracy in the height measurement, the relation sh=xf according to above can be differentiated to $(s+\Delta s)(h+\Delta h)=xf$, or (by substituting $xf/s=h$)

$$\Delta h = \frac{1}{\left(\frac{1}{h} + \frac{\Delta s}{xf}\right)} - h$$

Assuming now that h=1.5 m, x=0.04 m, f=0.04 m, and $\Delta s$=1.0 μm, the accuracy in the height measurement according to this principle becomes $|\Delta h|<0.001$ m. Hence, for typical numbers, the accuracy will be within about 1 mm or better.

Although the height measurement principle described above utilizes two reflecting prisms for the displacement of the rays, it is to be understood that one ray may propagate without displacement and that displacement of only one ray may be sufficient. It should also be noted that various other elements may be used instead of reflecting prisms for this purpose.

In the foregoing description, details about the inventive features have been described and exemplified. It should be understood that an instrument or a method according to this invention will take advantage of various additional functions. Once the present specification has been read and understood, the skilled person will understand how an instrument according to the present invention can be made and used using various previously known and new features and sub-components.

CONCLUSION

A geodetic instrument is disclosed, wherein an image sensor is used for locating the instrument above a desired point on the ground. The positioning of the image sensor with respect to the instrument vertical rotation axis is determined, or calibrated, using a method where two images are captured at different horizontal rotational positions for the instrument, and where the center pixel of the image sensor is related to the vertical rotation axis by means of image processing. It is also disclosed how reflecting elements, such as prisms, may be used for providing stereoscopic vision that can be used for determining the instrument height above the ground.

The invention claimed is:

1. A method in a geodetic instrument having an image sensor for capturing an image of the ground below the instrument, comprising the steps of:
   capturing a first image using said image sensor;
   rotating the instrument around its vertical axis to a new rotational position;
   capturing a second image using said image sensor; and
   processing the captured images to correlate a nadir point for the instrument vertical rotation axis in relation to the image sensor.

2. The method of claim 1, wherein the first and second images are captured at rotational positions substantially 180 degrees from each other.

3. The method of claim 1, further comprising the step of displaying an image of the ground below the instrument on a screen of the instrument, and indicating the nadir point in said image on the screen.

4. The method of claim 1, further comprising the step of acquiring a desired origin of coordinates and relating the desired origin of coordinates to the instrument nadir point, wherein this relation of the origin to the instrument nadir point is used in subsequent geodetic measurements performed by the instrument to relate instrument measurements to the desired origin of coordinates.

5. The method of claim 4, wherein the desired origin of coordinates is acquired from an indication made in one of the captured images.

6. A method for determining a height above ground for a geodetic instrument comprising an image sensor, lens means for forming an image on said image sensor, and means for effecting a parallel displacement of a ray impinging upon said image sensor, comprising the steps of:
   capturing a first image of the ground using a parallel displacement of the ray;
   capturing a second image of the ground;
   determining a separation between the first and the second image on the image sensor; and
   calculating the height based on the amount of parallel displacement, said separation, and the focal length of said lens means.

7. The method of claim 6, wherein the second image is captured using a parallel displacement of equal magnitude to that used for capturing the first image, but in a different direction.

8. A geodetic instrument, comprising:
   a base;
   an alidade rotatably mounted on the base;
   an image sensor structured and arranged to capture an image, wherein the image sensor is positioned in fixed relation to said alidade and directed to capture an image of the ground below the instrument; and
   an image processor for processing at least two captured images to relate instrument nadir to the image sensor.

9. The instrument of claim 8, further comprising an input device for receiving an origin of coordinates related to the captured image, and means for determining the displacement between said instrument nadir and said origin of coordinates.

10. A geodetic instrument comprising an image sensor, lens means for forming an image on said image sensor, and means for effecting a parallel displacement of a ray impinging upon said image sensor, and further comprising
    means for providing, on the image sensor, a first image of the ground below the instrument using a parallel displacement of the ray;
    means for providing, on the image sensor, a second image of the ground below the instrument;
    means for determining a separation between the first and the second image provided on the image sensor; and
    means for calculating the instrument height above the ground based on the amount of parallel displacement, said separation, and the focal length of said lens means.

11. The instrument of claim 10, wherein the means for providing the second image uses a parallel displacement of equal magnitude to that used for capturing the first image, but in a different direction.

12. The instrument of claim 10, wherein the distance between the lens means and the image sensor is substantially equal to the focal length of said lens means.

13. The instrument of claim 10, comprising a reflecting prism for effecting said parallel displacement.

14. The instrument of claim 10, further comprising at least one filter for separating said first and second images.

15. The instrument of claim 10, further comprising at least one shutter for separating said first and second images.

16. Computer software stored on a computer readable medium, said software containing instructions for a processor in a geodetic instrument to perform the method according to claim 1 when executed.

17. Computer software stored on a computer readable medium, said software containing instructions for a processor in a geodetic instrument to perform the method according to claim 6 when executed.

* * * * *